US007606396B2

(12) United States Patent
Miller et al.

(10) Patent No.: US 7,606,396 B2
(45) Date of Patent: Oct. 20, 2009

(54) MULTIMODAL BIOMETRIC PLATFORM

(75) Inventors: James S. Miller, Poway, CA (US); William Frederic Willis, Laguna Nigel, CA (US); Johann Herbert Lau, Escondido, CA (US); Daniel Dlab, Ottawa (CA)

(73) Assignee: ImageWare Systems, Inc., San Diego, CA (US)

( * ) Notice: Subject to any disclaimer, the term of this patent is extended or adjusted under 35 U.S.C. 154(b) by 0 days.

(21) Appl. No.: 11/927,476

(22) Filed: Oct. 29, 2007

(65) Prior Publication Data

US 2008/0049983 A1 Feb. 28, 2008

Related U.S. Application Data

(62) Division of application No. 10/991,352, filed on Nov. 16, 2004, now Pat. No. 7,298,873.

(51) Int. Cl.
G06K 9/00 (2006.01)
G06F 7/04 (2006.01)
(52) U.S. Cl. .......................... 382/116; 340/5.82; 902/3
(58) Field of Classification Search ........................ None
See application file for complete search history.

(56) References Cited

U.S. PATENT DOCUMENTS

| 6,018,739 | A | 1/2000 | McCoy et al. |
| 6,289,112 | B1 | 9/2001 | Jain et al. |
| 6,393,139 | B1 | 5/2002 | Lin et al. |
| 6,526,396 | B1 * | 2/2003 | Hiratsuka et al. ............. 706/52 |
| 6,591,224 | B1 * | 7/2003 | Sullivan et al. ............. 702/179 |
| 6,751,733 | B1 * | 6/2004 | Nakamura et al. .......... 713/182 |
| 6,898,299 | B1 * | 5/2005 | Brooks ........................ 382/115 |
| 2003/0031348 | A1 | 2/2003 | Kuepper et al. |
| 2004/0133582 | A1 | 7/2004 | Howard et al. |
| 2004/0243567 | A1 | 12/2004 | Levy |
| 2005/0138391 | A1 | 6/2005 | Mandalia et al. |
| 2005/0265607 | A1 * | 12/2005 | Chang ........................ 382/224 |
| 2006/0171571 | A1 | 8/2006 | Chan et al. |
| 2006/0260988 | A1 | 11/2006 | Schneider et al. |

OTHER PUBLICATIONS

Abstract of Japanese Patent Application JP 2003178031 (English translation).
Informational brochure entitled "IWS Biometric Engine," ImageWare® Systems, Inc., Copyright 1999-2004, pp. 1-4.
Ross A. et al., "Multimodal biometrics: an overview," Proc. Of 12$^{th}$ European Signal Processing Conference (EUSIPCO), Vienna, Austria, 2004:1221-24.

(Continued)

Primary Examiner—Charles Kim
(74) Attorney, Agent, or Firm—Townsend and Townsend and Crew LLP

(57) ABSTRACT

A multimodal biometric identification or authentication system includes a plurality of biometric clients. Each of the biometric clients may include devices for capturing biometric images of a plurality of types. The system includes a router in communication with the biometric clients. The router receives biometric images from, and returns biometric scores or results to, the biometric clients. The system includes a plurality of biometric matching engines in communication with the router. Each biometric matching engine includes multiple biometric processors. Each biometric processor is adapted to process biometric data of a particular type. The biometric matching engines transmit and receive biometric data to and from the router.

11 Claims, 11 Drawing Sheets

OTHER PUBLICATIONS

Jain, Anil K. et al., "Multibiometric Systems," Communications of the ACM, Special Issue on Multimodal Interfaces, 2004, 47(1):34-40.

Indovina, M. et al., "Multimodal biometric authentication methods: A COTS approach," Proc. MMUA 2003, Workshop on Multimodal User Authentication, Santa Barbara, CA, Dec. 11-12, 2003, pp. 99-106.

Wang, Y. et al., "Combining face and iris biometrics for identity verification," Proc. Of 4th Int'l Conf. on Audio- and Video-Based Biometric Person Authentication (AVBPA), Guilford, UK, Jun. 9-11, 2003, pp. 805-813.

Kumar, A. et al., "Personal verification using palmprint and hand geometry biometric," Proc. Of 4th Int'l Conf. on Audio- and Video-Based Biometric Person Authentication (AVBPA), Guilford, UK, Jun. 9-11, 2003, pp. 668-678.

Ross, A. et al., "Information fusion in biometrics," Pattern Recognition Letters, (2003) 24(13):2115-25.

Jain, A.K. et al., "Learning user-specific parameters in a multibiometric system," Proc. International Conference on Image Processing (ICIP), Rochester, NY, Sep. 22-25, 2002, pp. 57-60.

Ross, A. et al., "Information fusion in biometrics," Proc. 3rd International Conference on Audio- and Video Based Person Authentication (AVBPA), Sweden, Jun. 6-8, 2001, pp. 354-359.

* cited by examiner

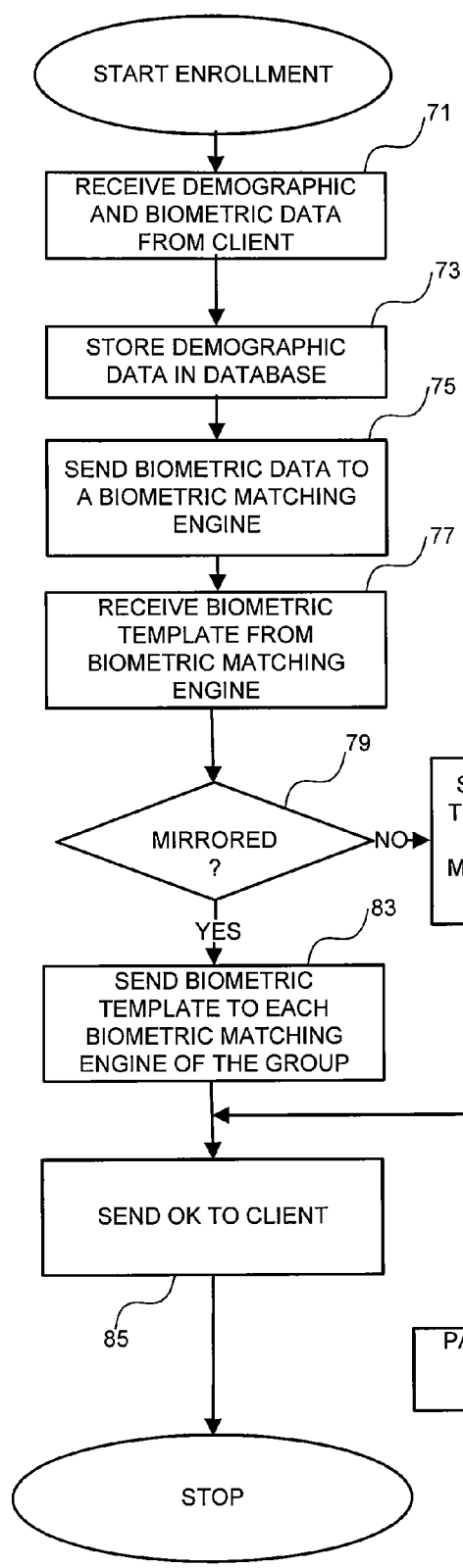
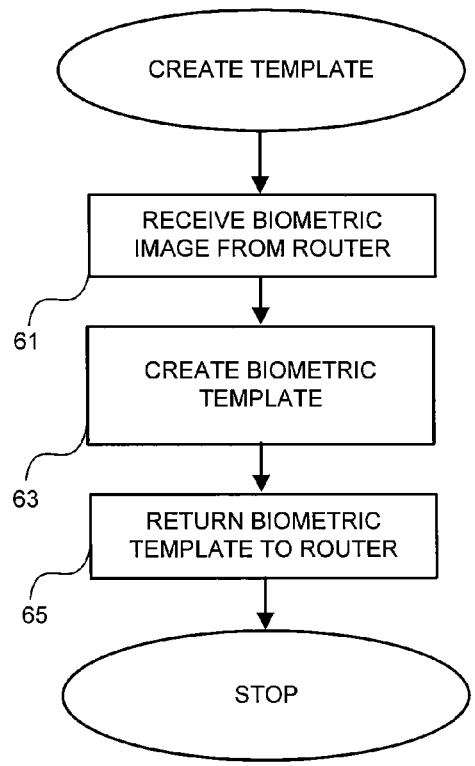
FIG. 5
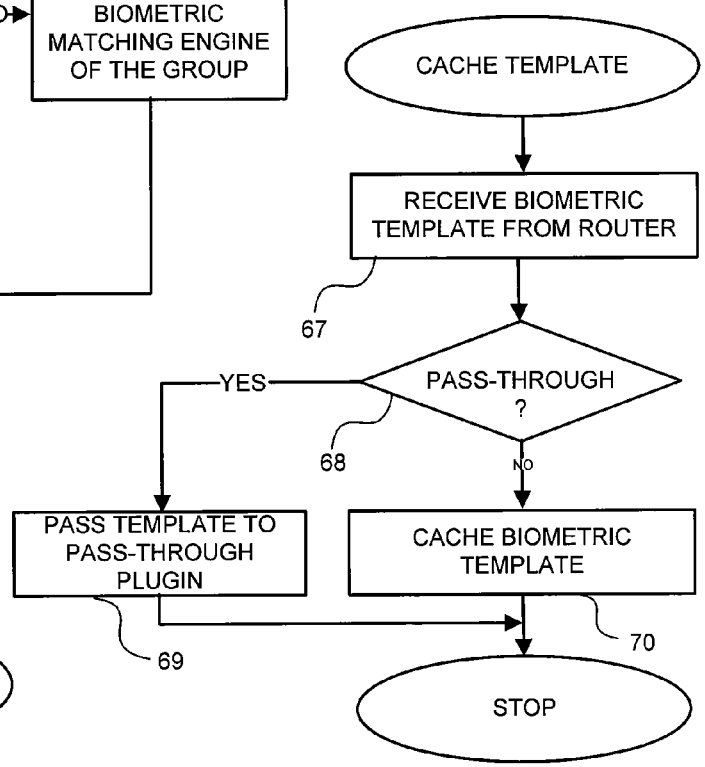
FIG. 8
FIG. 6

MULTIMODAL BIOMETRIC PLATFORM

CROSS-REFERENCES TO RELATED APPLICATIONS

This application is a divisional application of U.S. patent application Ser. No. 10/991,352, filed Nov. 16, 2007, the disclosure of which is hereby incorporated by reference in its entirety for all purposes.

BACKGROUND OF THE INVENTION

The present invention relates generally the field of biometric identification and authentication, and more particularly to a multimodal biometric system and method.

Biometrics is a generic term for characteristics that can be used to distinguish one individual from another, particularly through the use of digital equipment. An example of a biometric is a fingerprint. Trained analysts have long been able to match fingerprints in order to identify individuals. More recently, computer systems have been developed to match fingerprints automatically. Examples of biometrics that have been, or are now being, used to identify, or authenticate the identity of, individuals include 2D face, 3D face, hand geometry, single fingerprint, ten finger live scan, iris, palm, full hand, signature, ear, finger vein, retina, DNA and voice. Other biometric may include characteristic gaits, lip movements and the like. New biometric are being developed or discovered continually.

Biometrics have been used both for identification and authentication. Identification is the process of identifying or detecting the presence of an unknown individual. Identification typically involves a one to N or complete search of stored biometric information. Common uses of identification are law enforcement facial mug shot or fingerprint searches, drivers license facial photo or fingerprint searches to ensure that a particular individual is not issued more than one drivers license, and various crowd scanning schemes to detect criminals or terrorists.

Authentication is the process of verifying that an individual is who he says he is. The individual presents something such as a card or computer logon name that identifies him. Then a biometric obtained from the individual is compared to a stored biometric to authenticate the individual's identity. Authentication is useful for controlling access to secure locations and systems and for controlling the uses of credit cards and the like.

In these days of heightened security, biometrics are becoming increasingly important. One of the goals in biometrics is increased accuracy so that there are fewer false negative and false positive indications. Every biometric has some limitations. Some biometrics are inherently more accurate than others. It is estimated that approximately 5% of the individuals in most populations do not have legible fingerprints. The accuracy of some face recognition systems may be dependent on ambient lighting and the pose of the subject.

A problem in current biometric identification and authentication is "spoofing", which amounts to tricking the biometric capture device. Some devices may be spoofed by presenting a previously captured authentic image to the capture device. The device may capture the counterfeit image and then identify the wrong individual.

One solution both to the accuracy and spoofing concerns is to use multiple biometrics in identifying or authenticating the identity of an individual. For any single biometric, there is a finite probability that multiple individuals will match on that biometric. However, biometrics tend to be independent of each other so that it is unlikely that individuals that match on one biometric would match on multiple biometrics. Accordingly, the likelihood that an individual would score false positives on multiple biometric tests is low. In order to spoof a system that uses multiple biometrics, one would have to have to obtain counterfeit images for each biometric. Thus, there is a desire to provide multimodal biometric platforms. However, there are a number of problems with current attempts to provide a multimodal biometric platform.

BRIEF SUMMARY OF THE INVENTION

The present invention provides a multimodal biometric identification and/or authentication system. A system according to the present invention may include a plurality of biometric clients. Each of the biometric client may include devices for capturing biometric images of a plurality of types. Examples of biometric image capture devices are well known and may include digital cameras for capturing images for facial recognition, fingerprint scanners for capturing images for fingerprint recognition, iris scanners for capturing images for iris recognition, hand geometry sensors, and the like. The system includes a router in communication with the biometric clients. Among other things, the router receives biometric images from, and returns biometric scores or results to, the biometric clients. The system includes a plurality of biometric matching engines in communication with the router. Each biometric matching engine may include multiple biometric processors. Each biometric processor is adapted to process biometric data of a particular type. Among other things, the biometric matching engines transmit and receive biometric templates to and from the router.

The biometric matching engines may include proprietary, third party, biometric applications that are implemented by means of software development kits (SDKs). The third party applications receive and compare pairs of biometric templates and return proprietary scores based upon the comparison. Each third party application is adapted to perform its work with respect to a particular biometric. For example, there are separate facial, fingerprint and iris applications, each application generally being available from a separate entity. The biometric matching engines include a plugin application for each biometric application. The plugins provide a number of functions. As well as providing a interface between the biometric application and the router, the plugins may create biometric templates from biometric images, cache biometric templates, preferably in physical memory, provide probe templates and enrolled templates to their associated biometric application for comparison and scoring, and return scores to the router. The plugins may also normalize or otherwise process scores received from the biometric applications.

The biometric matching engines are organized into groups, based upon their capabilities. Each biometric matching engine of a group can process the same types of biometrics. A biometric matching engine may belong to more than on group.

According to the present invention, all communication between the biometric clients and the biometric matching engines goes through the router. The biometric clients and the biometric matching engines see only the router. During an enrollment phase, the biometric clients send biometric and demographic data to the router. The router stores the demographic data and sends the biometric data to a biometric matching engine of an appropriate group. The plugins of the biometric matching engine convert the images of the biometric data to templates and send the templates back to the router.

The router sends the templates back to one or all of the biometric matching engines of the group, depending on the configuration of the system. The system may be configured for striped operation, in which case, the templates are sent to one biometric matching engine of the group. In the striped configuration, the router uses a load balancing scheme to ensure that each biometric matching engine of a group has approximately the same number of enrolled templates in its cache. Alternatively, the system may be configured for mirrored operation. In the mirrored configuration, router sends the templates to each biometric matching engine of the group. In either configuration, the biometric matching engines cache the enrolled templates they receive from the router, preferably in physical memory.

During a search phase, a biometric client sends target biometric data to the router. The router sends the target biometric data to one or all of the biometric matching engines of an appropriate group, depending on the configuration of the system. If the system is in the striped configuration, the router sends the target data to each biometric matching engine of the group. If the system is in the mirrored configuration, the router sends the target data to a single available biometric matching engine of the group. In either configuration, the biometric matching engine converts the target data to probe templates and then provides a probe template and enrolled templates to the appropriate biometric application for comparison and scoring. The biometric matching engine sends scores back to the router. In the striped configuration, the router accumulates the scores from all the biometric matching engines before reporting the scores back the biometric client.

Since the biometric applications of the biometric matching engines generally produce proprietary, non-standardized scores, the present invention provides methods of producing more meaningful combined or normalized scores. In one embodiment, a biometric matching engine implements a search pruning strategy. According to the search pruning strategy, the biometric matching engine compares a probe biometric template of a first type to enrolled biometric templates of the first type to produce a set of first scores. The biometric matching engine saves in a match set biometric data records for which the first score for the data record is greater than a first biometric threshold. The biometric matching engine then compares a probe biometric template of a second type to biometric templates of the second type in said match set to produce a set of second scores. The biometric matching engine saves biometric data records for the second score for the data record is greater than a second biometric threshold. The biometric matching engine repeats the process until all template types have been processed, which results in a set of data records that have score higher than a threshold in each category.

In a second embodiment, the system uses statistical analysis of enrollment data to produce normalized scores. Individuals are enrolled in a biometric database by storing for each individual a plurality of biometric templates of one type. The system compares each biometric template in the database with every other biometric template of the database to obtain biometric scores. If a biometric score is obtained by comparing one biometric template of an individual with another biometric template for that same individual, the system puts that score in a matching category. If a biometric score is obtained by comparing a biometric template of an individual with a biometric template for different individual, the system puts that score in a non-matching category. The system analyzes the scores in the matching category to determine the probability that a particular score is a matching score. The system analyzes the scores in the non-matching category to determine a probability that a particular score is not a matching score.

BRIEF DESCRIPTION OF THE DRAWINGS

FIG. 5 is a flowchart of an embodiment of biometric matching engine enrollment processing according to the present invention.

FIG. 6 is a flowchart of an embodiment of biometric matching engine template caching according to the present invention.

FIG. 8 is a flowchart of an embodiment of router enrollment processing according to the present invention.

DETAILED DESCRIPTION OF THE INVENTION

Figure 1:
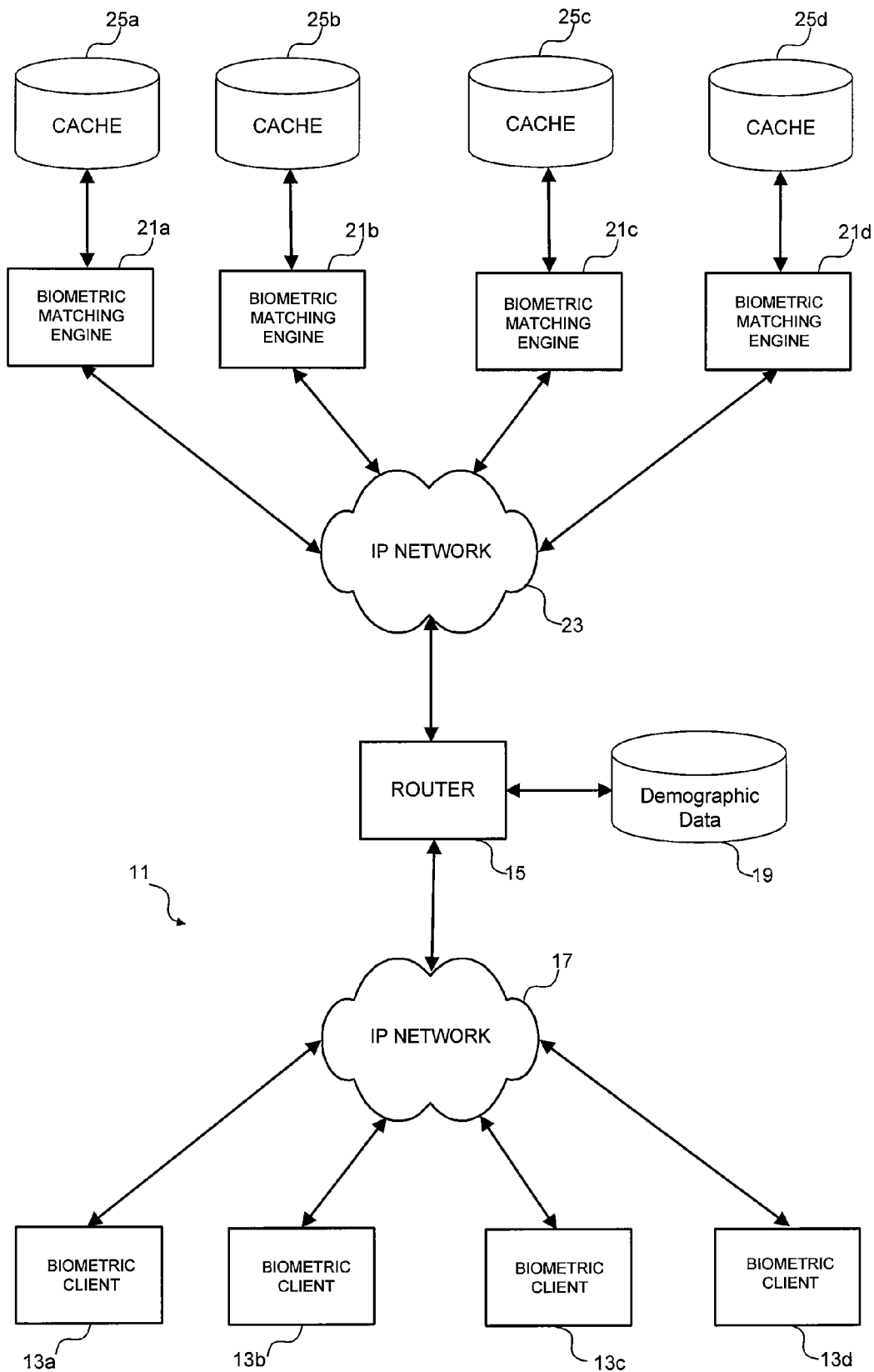
FIG. 1 is a block diagram of an embodiment of the present invention.

Referring now to the drawings, and first to FIG. 1, an embodiment of a system according to the present invention is designated generally by the numeral 11. System 11 includes a plurality of biometric clients 13. Biometric clients 13 comprise computers having installed thereon a suitable operating system and biometric software, preferably implemented in a client software development kit (SDK).

Biometric clients 13 are in communication with a router 15 through a suitable network, such as Internet Protocol (IP) network 17. Router 15 comprises a computer having installed thereon a suitable operating system and biometric software programmed according to the present invention. Router has associated therewith storage 19 for storing demographic data.

Router 15 is in communication with a plurality of biometric matching engines 21 through a suitable network, such as IP network 23. Each biometric matching engine 21 comprises a computer having installed thereon a suitable operating and biometric software according to the present invention. As will be described in detail hereinafter, biometric matching engines 21 are adapted to process multimodal biometric data. Each biometric matching engine 21 has associated therewith a cache 25, which preferably implemented in physical memory.

Figure 2:
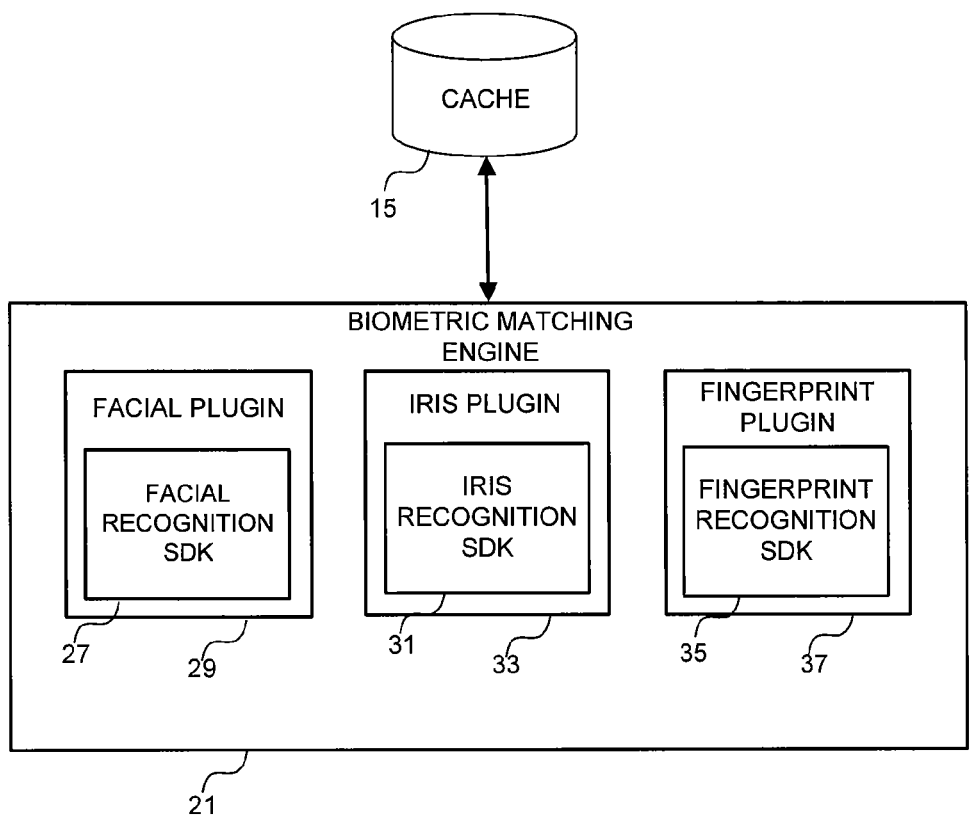
FIG. 2 is a block diagram of an embodiment of a biometric matching engine according to the present invention.

Referring now to FIG. 2, there is illustrated a block diagram of an embodiment of a biometric matching engine 21 according to the present invention. Biometric matching engine 21 communicates with router 15 (FIG. 15) and moves templates into and out of cache 25. Biometric matching engine 21 converts biometric images into templates at enrollment time and creates probe templates to compare against stored records at search time.

In the example of FIG. 2, biometric matching engine 21 includes a facial recognition SDK 27, an iris recognition SDK 31, and fingerprint recognition SDK 35. SDKs 27, 31 and 35 are typically proprietary applications provided by third parties. For example, facial recognition SDK 27 may be a proprietary facial recognition application provided by a vendor such as COGNITEC™. Facial recognition SDK is adapted to compare facial biometric templates and return a score that represents the degree of similarity of the templates. Similarly, iris recognition SDK 31 may be a proprietary iris recognition application provided by a vendor such as IRIDIAN™. Iris recognition SDK is adapted to compare iris biometric templates and return a score that represents the degree of similarity of the templates. Fingerprint recognition SDK 35 may be a proprietary fingerprint recognition application provided by a vendor such as IDENTIX™.

It will be recognized by those skilled in the art that a biometric matching engine may include any combination of one or more separate biometric algorithms or SDKs. Such SDKs may include 2D face, 3D face, hand geometry, single fingerprint, ten finger live scan, iris, palm, full hand, signature, ear, finger vein, retina, DNA, voice or any other biometric, all available from several well known vendors.

Each SDK 27, 31 and 35 is wrapped in a plugin. Facial recognition SDK 27 is wrapped in a facial plugin 29. Iris recognition SDK 31 is wrapped in an iris plugin 33. Fingerprint recognition SDK 35 is wrapped in a fingerprint plugin 37. Each plugin 29, 33 and 37 is a modules that adheres to a common interface that allows biometric matching engine 21 to communicate with the SDK 27 about which the plugin is wrapped. Because a plugin has a common interface, it can be "plugged in" to the system with extremely minor setup and without the biometric matching engine 21 having much knowledge about which third party SDK is being wrapped.

Facial plugin 29 and iris plugin 33 may be referred to as "normal" plugins. Normal plugins are interfaces between biometric matching engine 21 and their associated SDK. Normal plugins enable biometric matching engine 21 to supply probe and enrolled templates to their associated SDK for comparison and scoring. Normal plugins further enable biometric matching engine 21 to receive scores from their associated SDK for transmission to router 15 (FIG. 1).

The combination of fingerprint recognition SDK 35 and fingerprint plugin 37 is somewhat different from that described with respect to the facial and iris recognition applications. Historically, fingerprint searching has been aimed at emulating the behavior of Automated Fingerprint Identification System (AFIS) systems, which handle the enrollment, storage, and searching of fingerprints. Most fingerprint matching algorithms and SDKs do not provide a method to simply compare one template to another and generate a score. Rather, they all provide their own special 'database' that fingerprints must be enrolled in. In order to make a comparison, a system passes in a probe image, and the SDK produces a score. Accordingly, a plugin of the type of fingerprint plugin 37 is known as a "pass-through" plugin. Biometric matching engine 21 passes fingerprint templates through fingerprint plugin for enrollment in the database of fingerprint recognition SDK, rather than storing them in cache 25.

As shown in FIG. 2, multiple plugins can be used on a single biometric matching engine, so any single biometric matching engine might be responsible for storing any number of different template types. Of course, according to the present invention, a biometric matching engine may comprise different numbers and combinations of SDKs and plugins.

Figure 3:
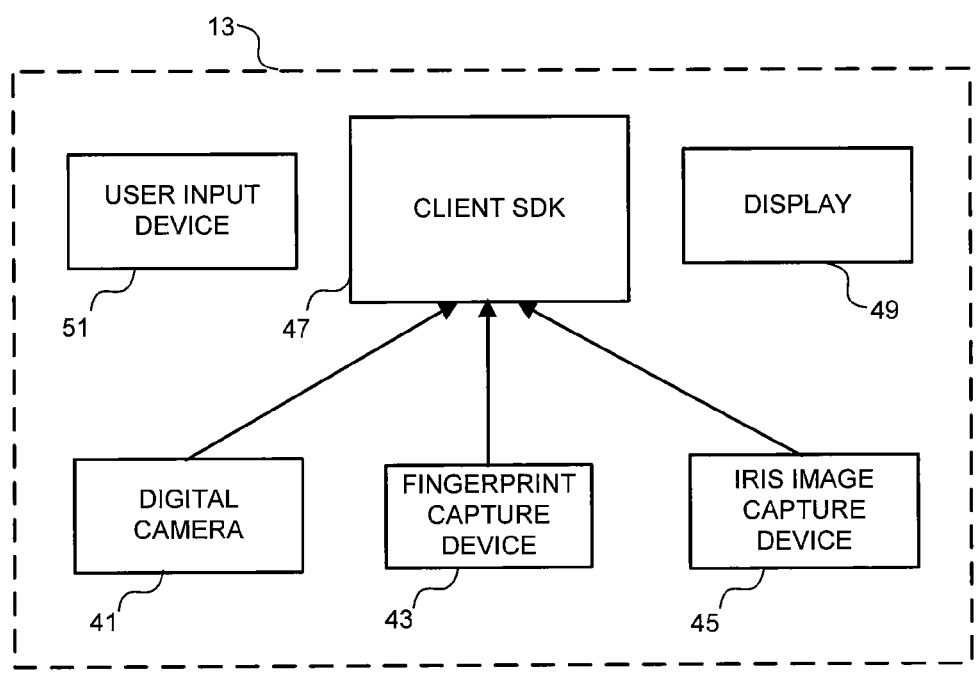
FIG. 3 is block diagram of an embodiment of a biometric client according to the present invention.

Referring now to FIG. 3, there is illustrated a high level block diagram of an example of a biometric client 13. Biometric client 13 is implemented a computer having a suitable operating system and various application programs. Biometric client 13 includes commercially available biometric input and capture devices, such as a digital camera 41 for capturing facial images, a fingerprint scanner 43 and an iris image capture device 45. Capture devices generally may include 2D face, 3D face, hand geometry, single fingerprint, ten finger live scan, iris, palm, full hand, signature, ear, finger vein, retina, DNA and voice capture devices. Biometric client 13 includes a client SDK 47 that collects and formats biometric data captured by the capture device for transmission to router 15 (FIG. 1) and presents information returned from router 15. Biometric client may include a display 49 and a user input device 51, such as a keypad, keyboard, mouse or the like. Biometric client 13 may also include an interface to an access control device such as an automatic door lock.

Figure 4:
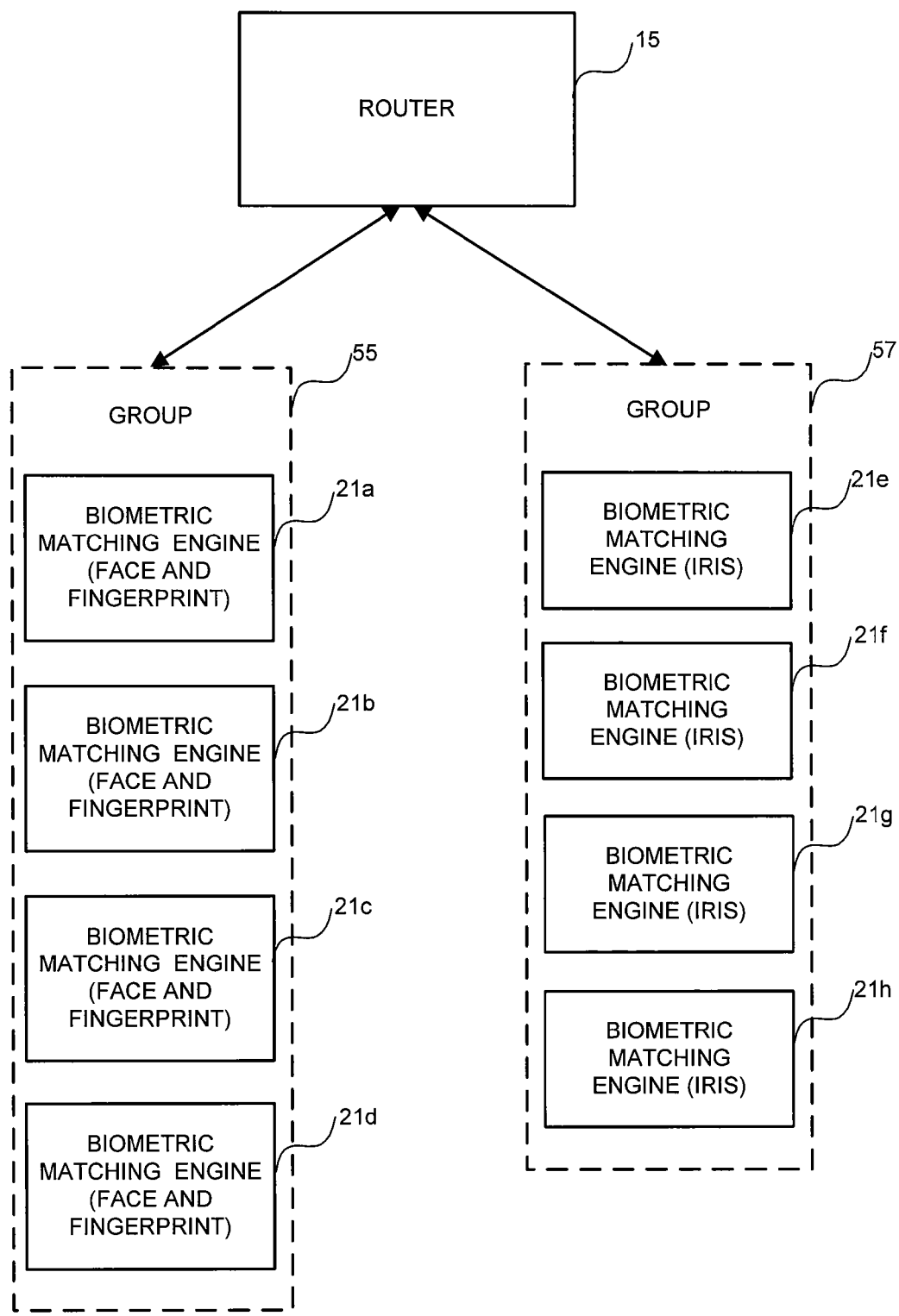
FIG. 4 is a block diagram illustrating biometric matching engine grouping according to the present invention.

As shown in FIG. 4, biometric matching engines 21 may be organized in groups. A biometric matching engine group comprises one or more biometric matching engines having the same biometric capabilities. In FIG. 4 a first biometric matching engine group 55 comprises biometric matching engines 21a-21d, each of which is adapted to process face and fingerprint biometric data. A second biometric matching engine group 57 comprises biometric matching engines 21e-21h, each of which is adapted to process iris biometric data. A biometric matching engine group may comprise as many biometric matching engines as are necessary to meet the demands of the system. A system may be scaled up or down simply by adding or removing biometric matching engines. A single biometric matching engine may be in multiple groups. For example, a biometric matching engine with face, fingerprint and iris capabilities would be a member of both groups 55 and 57.

Router 15 may configure the groups to optimize performance in terms of speed or concurrency. Router 15 can configure a group for striped or mirrored operation. In striped operation, templates are cached in a striped or distributed fashion across the biometric matching engines of the group. Each biometric matching engine caches only part of templates of the group. Router 15 distributes the templates to the biometric matching engines based upon a load balancing scheme that maintains the number of templates cached by each biometric matching engine approximately equal. In the example of FIG. 4, each biometric matching engine 21a-21d of group 55 would cache about 25% of the total number of templates in a striped configuration. In performing a search, each biometric matching engine 21a-21d would execute its searching routine. Thus, the search would be completed in 25% of the time it would take a single biometric matching engine to execute its searching routine over all the templates. However, in the striped configuration, the group can do only one search at a time. Thus, if there are concurrent requests for searches, the router 15 must queue the searches.

In the mirrored configuration, the templates are mirrored across the entire query group. Each biometric matching engine 21a-21d of group 55 would cache every template assigned to the group. In the mirrored configuration, router 15 instructs a single biometric matching engine 21 to execute a search. Thus, in the example of FIG. 4, up to four searches can be executed concurrently in the mirrored configuration without having to queue search requests. However, each search would take four times as long to complete as a search in the striped configuration. Speed and concurrency issues may be addressed by scaling the number of biometric matching engines in a group and configuring the group.

Enrollment of templates according to the present invention is illustrated with respect to FIGS. 5, 6 and 8. FIGS. 5 and 6 illustrate enrollment from a biometric matching engine's perspective. FIG. 8 illustrates enrollment from the router's perspective. From the biometric matching engine's perspective, enrollment comprises two independent processes. Referring to FIG. 5, a biometric matching engine receives a biometric image from the router at block 61. The biometric image may be of any type that the router is capable of handling. The biometric image may be a digital photograph of a face, a fingerprint scan, an iris scan, a wave file of a voice, or any other biometric image. The biometric matching engine creates a biometric template from the biometric image at block 62. Then, the biometric matching engine returns biometric template to the router at block 65 and the process ends.

The other part of enrollment from the biometric matching engines perspective is template caching, an example of which is illustrated in FIG. 6. A Biometric matching engine receives a template from the router at block 67. The biometric matching engine executing the process of FIG. 6 may or may not be the same biometric matching engine that executed the process of FIG. 5 to create the template. The biometric matching engine tests, at decision block 68, if the template of the pass-through type. As explained above, fingerprint recognition SDKs typically maintain their own cache of templates in a proprietary database. Accordingly, the biometric matching engine typically passes templates through a fingerprint SDK for caching by the SDK. If the template is adapted to be passed through to the SDK, the biometric matching engine passes the template to the pass-through plugin for caching in the database maintained by the SDK, as indicated at block 69. If the template is not adapted for pass-through, the biometric matching engine caches the template at block 70 and the process ends.

In a preferred embodiment, the biometric matching engine caches templates as part of a record. The record contains a record ID, which specifies an individual, and all biometric templates for that individual. For example, a record could contain face, fingerprint and iris templates for the individual associated with the record ID. Additionally, the record may contain multiple instances of a template type. For example, at enrollment, the system may capture multiple instances of each biometric image type.

Referring now FIG. 8, there is illustrated an example of an enrollment process from the router's perspective. The router receives demographic and biometric data from a client at block 71. Demographic data may include and individuals name, sex, height, weight, hair color, eye color, etc. The router stores the demographic data in the demographic database 19 (FIG. 1) at block 73. The router sends the biometric data, which includes one or more biometric images, to a biometric matching engine at block 75. There is an implicit wait for the query image to return the template or templates. When the router receives the template or templates from the biometric matching engine, as indicated at block 77, the biometric matching engine checks, at decision block 79, the group is configured for striped or mirror operation. If the configuration is not mirrored (i.e. striped), the router sends the template or templates to on biometric matching engine of the group, based upon a load balancing scheme, at block 81. If, at decision block 79, the configuration is mirrored, the router sends the biometric template or templates to each biometric matching engine of the group, at block 83. Then, the router reports OK to the client, at block 85, and enrollment processing ends.

Figures 7, 9:
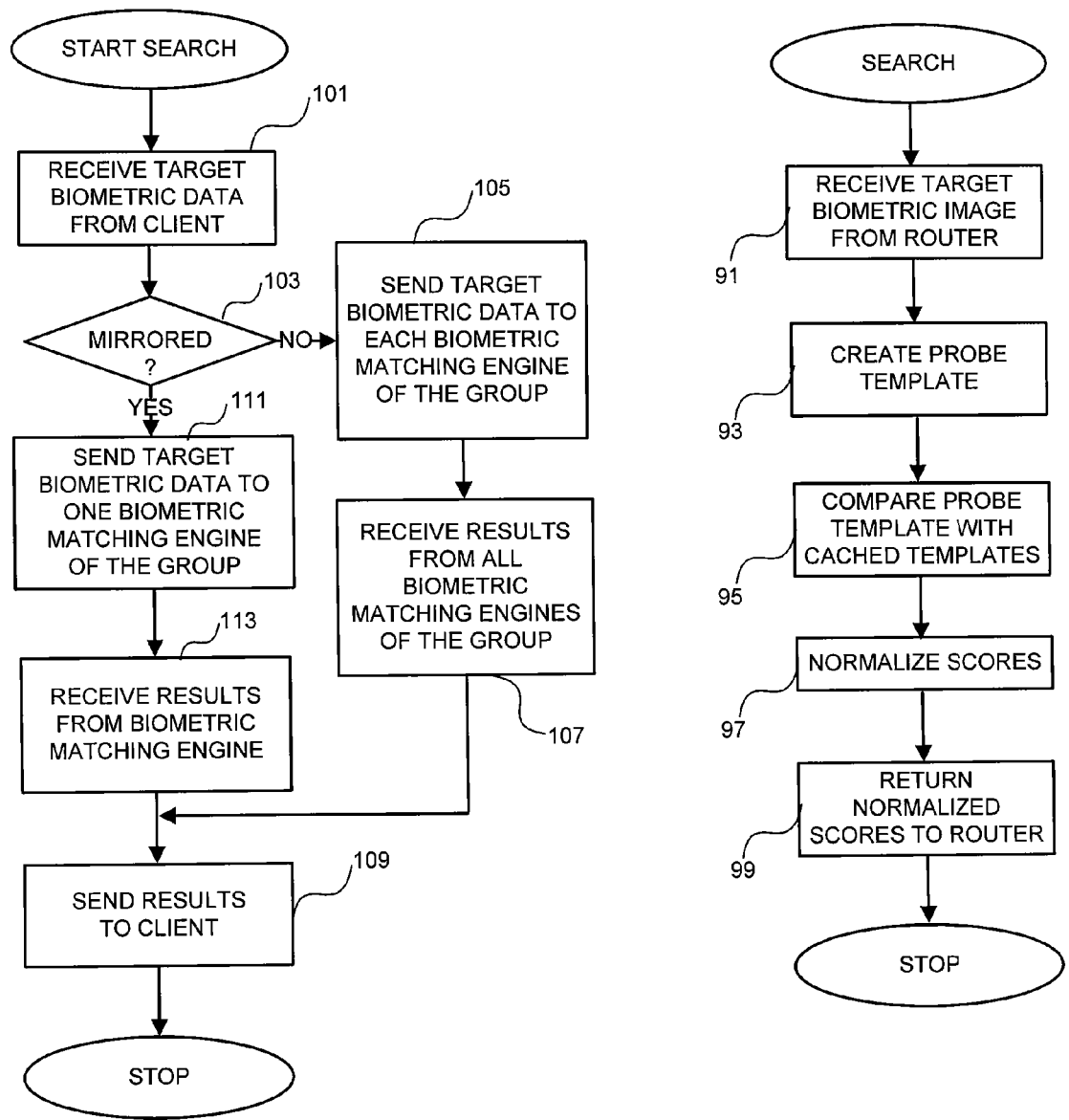
FIG. 7 is a flowchart of an embodiment of biometric matching engine search processing according to the present invention.
FIG. 9 is a flowchart of an embodiment of router search processing according to the present invention.

Referring now to FIGS. 7 and 9, there illustrated search processing. FIG. 7 illustrates searching from a biometric matching engines perspective. FIG. 9 illustrates searching from the biometric matching engine's perspective. As shown in FIG. 7, a biometric matching engine receives one or more target biometric images from the router, at block 91. The biometric matching engines creates a probe template for each target image received, at block 93. Then, the biometric matching engine compares the probe template or templates with each template in its cache, at block 95. It will be recalled that an appropriate plugin passes the probe and a template from the cache to the appropriate SDK biometric application. As will be explained in detail hereinafter, the biometric matching engine may normalize the scores provided by the biometric application, as indicated generally at block 99. The biometric matching engine then returns the scores, typically above a certain threshold value, to the router, at block 99, and the process ends.

Referring to FIG. 9, the router receives target biometric data from a client, at block 101. The router determines, at decision block 103, if the appropriate group is configured for striped or mirrored operation. If the configuration is not mirrored, the biometric matching engine sends the target biometric data to each biometric matching engine of the group, at block 105. When the router receives results from all the biometric matching engines of the group, at block 107, the router sends the results to the client, at block 109, and the process ends. If, as determined at decision block 103, the configuration is mirrored, the router sends the biometric data to one available biometric matching engine of the group, at block 111. When the router receives the results from the router, at block 113, the router sends the results to the client, at block 109, and the process ends.

Scores produced by proprietary biometric algorithms are themselves proprietary and not standardized. Scores from one biometric algorithm may be in the range from 0 to 10,000 while scores from another biometric algorithm may be in the range of 50 to 100. While the scores in a single mode operation are meaningful in the sense that, with underlying knowledge they can be used to determine whether a score signifies a match, they are in a sense arbitrary. In order to combine scores and produce meaningful multimodal results according to the present invention, there are provided processes for normalizing or otherwise combining the scores.

One simple way to normalize the scores is by means of a system of weighted averages. Under such a system, each separate mobile score is multiplied by a weight factor that puts the scores in the same range. Then the weighted scores can be averaged to obtain a composite score. Weighted averaging is not entirely satisfactory due to various nonlinearities and variations in the proprietary scoring algorithms.

Figure 10:
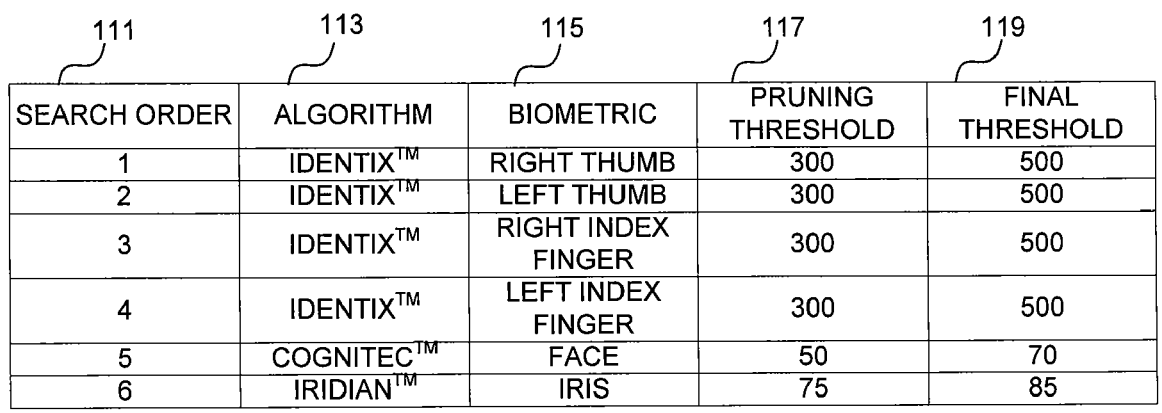
FIG. 10 illustrates an embodiment of a search pruning table according to the present invention.
Figure 11:
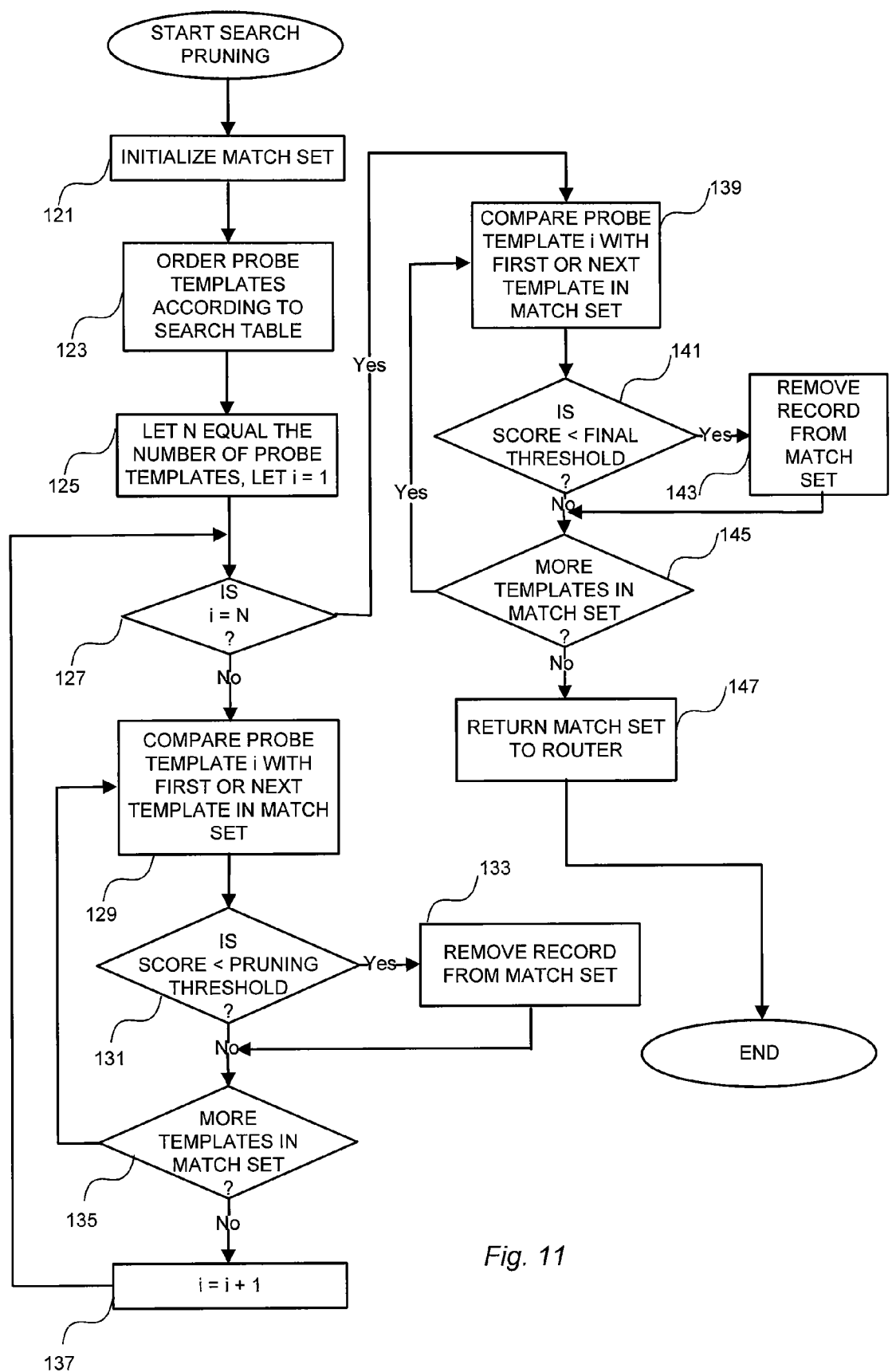
FIG. 11 is a flowchart of an embodiment of search pruning according to the present invention.

One method for combining scores is search pruning which is illustrated with respect to FIGS. 10 and 11. In FIG. 10 there is a table that specifies a search order and various thresholds for processing the results from a multimodal search according to the present invention. A search order is specified in Column 111. Search Order 111 specifies the order in which the search results are to be pruned. In Column 1 13 there is listed the algorithm. The biometric is listed in Column 115. Thus, referring to FIG. 10, the first score to be processed is the IDENTIX™ right thumb algorithm. For each biometric there is a pruning threshold, indicated in Column 117 and a final threshold indicated in Column 119. The pruning and final thresholds are set with reference to and knowledge of to the scoring system of each particular proprietary algorithm. The thresholds may be tuned so as not to produce too many or too few final candidates.

Referring now to FIG. 11, there is shown a flowchart of an example of search pruning according to the present invention. A match set is initialized at block 121. Initially, the match set is all record IDs in the cache. The system orders the probe templates according to the search table, at block 123. For example, if the biometrics are iris, face, and left thumb, the system would perform the search on the left thumb first, then the face, and then the iris, as indicated in FIG. 10. The system then lets N equal the number of probe templates and lets index i equal one as indicated at block 125. Then, the system tests, at decision block 127 if i is equal to N. If not, the system compares probe template i with the first or next template in the match set, as indicated at block 129. Then, the system determines, at decision block 131 if the score returned from the comparison is less than the pruning threshold. If so, the system removes the record from the match set, at block 133. If, on the other hand, the score is greater than the pruning threshold, then the record ID is left in the match set. The system then determines, at decision block 135, if there are more templates in the match set. If so, the process returns to block 129 to compare template i with the next template in the match set. Processing continues to loop through blocks 129 to 133 until there are no more templates in the match set, as determined at decision block 135. Then, the system sets i equals i plus one at block 137 and processing returns to decision block 127. If, as determined at block 127, index i is not equal to N, then processing resumes at 129. If, however, i is equal to N, as determined at decision block 127, the system compares probe template i with the first or next template in the match set, as indicated at block 139. The system determines, at decision block 141, if the score is less than the final threshold determined from the table of FIG. 10. If so, the system removes the record from the match set, at block 143. If the score is not less than the final threshold, then the record ID is left in the match set. The system tests, at decision block 145 if there are more templates in the match set. If so, processing returns to block 139. If not, the system returns the match set to the router, at block 137 and processing ends. The match set returned to the router is the set of record IDs that have passed each threshold.

Figure 12A:
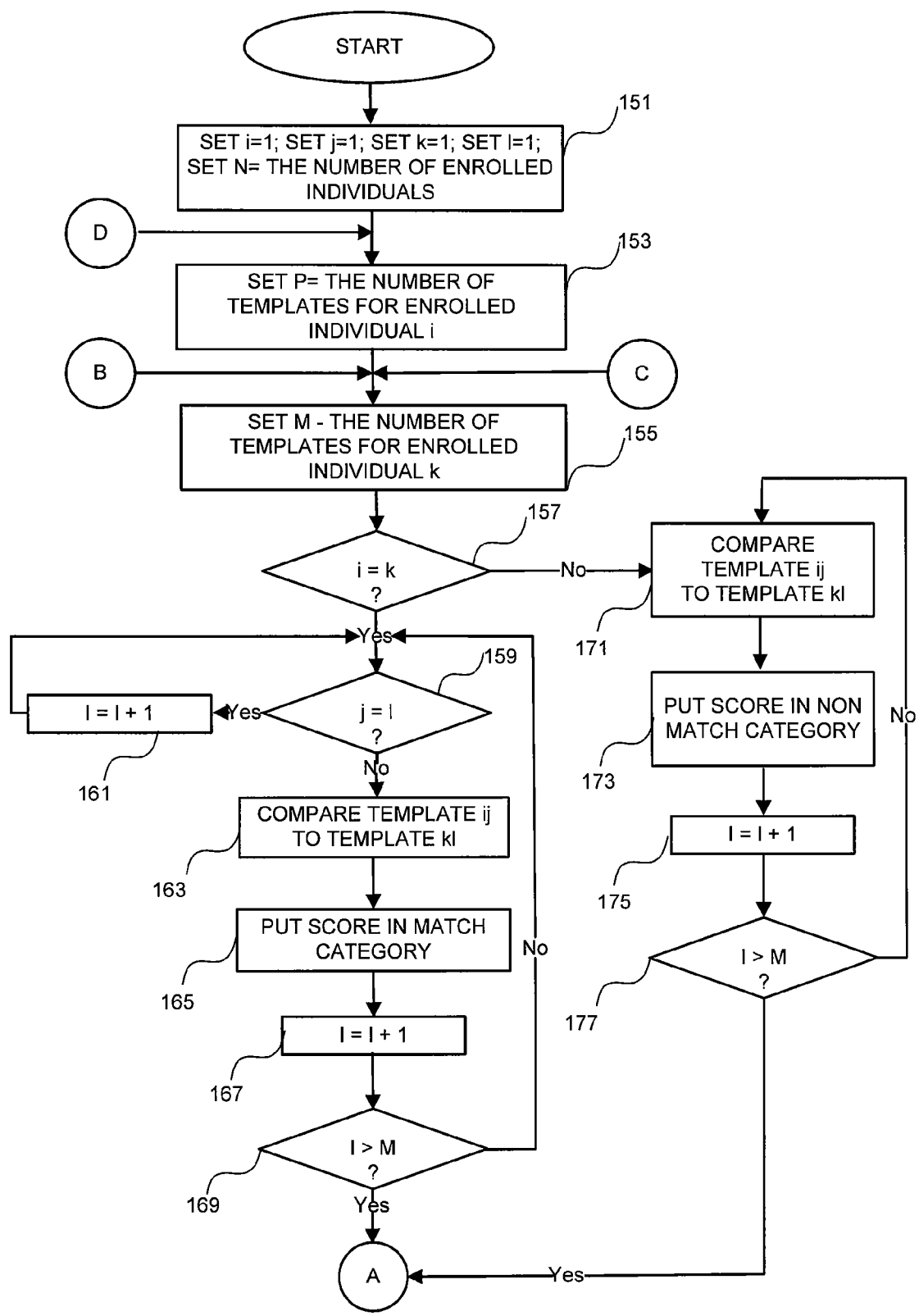
FIGS. 12A and 12B comprise a flowchart of an embodiment of statistical normalization according to the present invention.
Figure 12B:
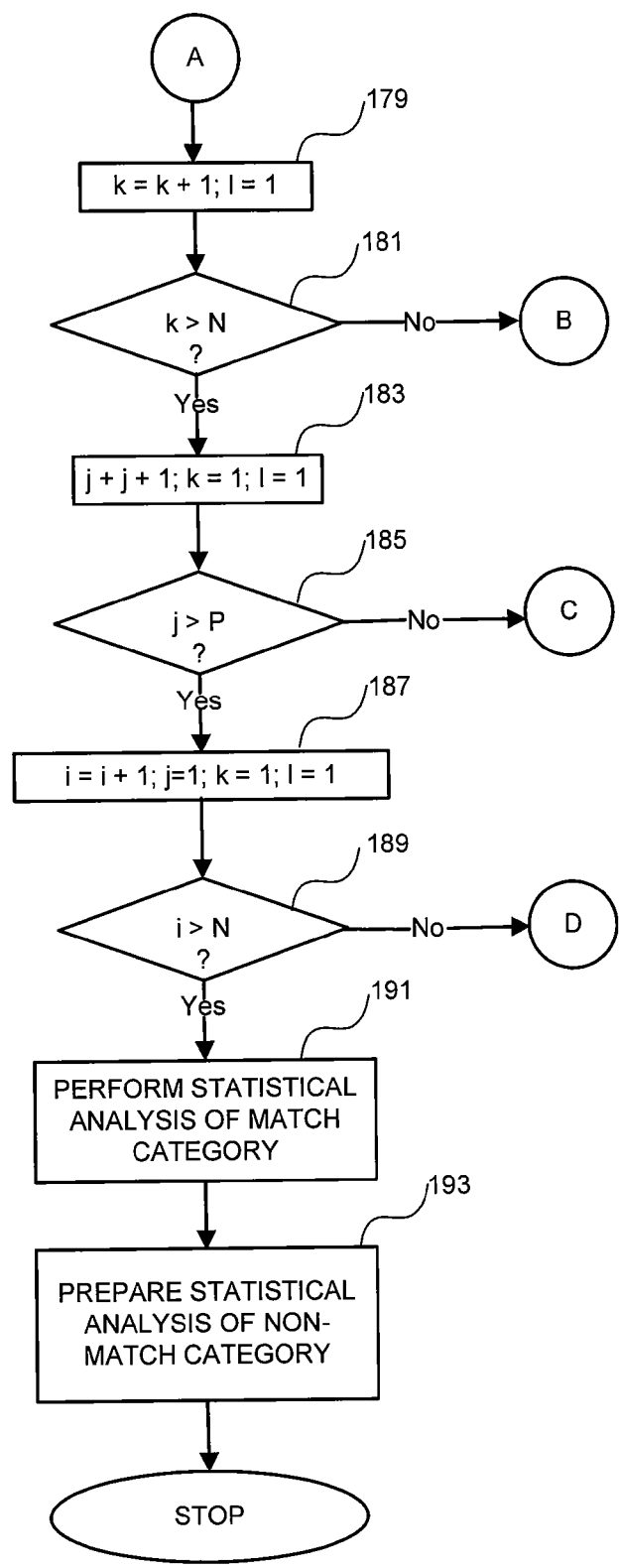

Referring now to FIGS. 12A and 12B, there is illustrated a process for normalizing scores returned from separate proprietary biometric applications. The system is initialized at block 151 by setting indices i, j, k and l equal to 1 and setting N equal to the number of enrolled individuals in the biometric matching engine group. Indices i and k represent, respectively, record ID numbers. Thus, indices i and k represent unique individuals enrolled in the system. Indices j and l represent template instances enrolled for an individual. Thus, template ij represents the jth template stored in association with the ith individual. According to the present invention, multiple templates of each type are enrolled for each individual.

The system sets P equal to the number of templates enrolled for the ith individual, at block 153. The system then sets N equal to the number of templates enrolled for individual k, at block 155. The system then tests whether index i is equal to index k, at decision block 157. Thus, the system determines at decision block 157 if a template under test belongs to a single individual. If so, the system tests at decision block 159 if index j equals index l. If so, index l is incremented by one, as indicated at block 161. Then the system compares template ij with template kl, as indicated at block 163. Thus, at block 163 a first template of an individual is compared with a second template of that same individual. The system puts the score produced from the comparison at block 163 into a match category, at block 165. The match category contains scores that were produced by matching a template of an individual against another template of that same individual. Thus, the match category contains scores that are known to represent matches. After putting the score in the match category at block 165, the system increments index l by one as indicated at block 167 and tests, at decision block 169 if l is greater than M. If not, processing returns to decision block 159.

Returning to decision block 157, if index i is not equal to index k, which indicates that individual i is not the same person as individual k, then the system compares template ij to template kl at block 171. The system puts the score resulting from the comparison at block 171 into a non-match category at block 173. The non-match category contains the scores that are known not to represent a match. Then, the system increments index l by one, at block 175, and tests at decision block 177 if index l is greater than M. If not, processing returns to block 171. Processing continues until index l is determined to be greater than M at decision block 169 or decision block 177. Then, the system sets index k equal to k plus one and index l equal to one at block 179. Then the system tests at decision block 181 if index k is greater than N. If not, processing returns to block 155 of FIG. 12A. If, as determined at decision block 181, index k is greater than N, then the system sets index j equal to j plus one, k equal to one, and l equal to one, at decision block 183. Then, the system tests, at decision block 185, if index j is greater than P. If not, the system returns to block 155 of FIG. 12A. If, as determined at decision block 185, index j is greater than P, then the system sets index i equal to i plus one, j equal to one, k equal to one and l equal to one, as indicated at block 187, and then tests at decision block 189 if index i is greater than N. If not, processing returns to block 153 of FIG. 12A.

Processing continues through the various loops described until each template enrolled for each individual has been compared with every other template in the system. At the completion of processing described thus far with respect to FIGS. 12A and 12B, the match category contains all scores known to be matches. The non-match category contains all scores known not to be matches. After collecting all the scores in either the match or the non-match category, the system performs statistical analysis of the match category, as indicated at block 191, and statistical analysis of the non-match category, as indicated at block 193.

Figure 13:
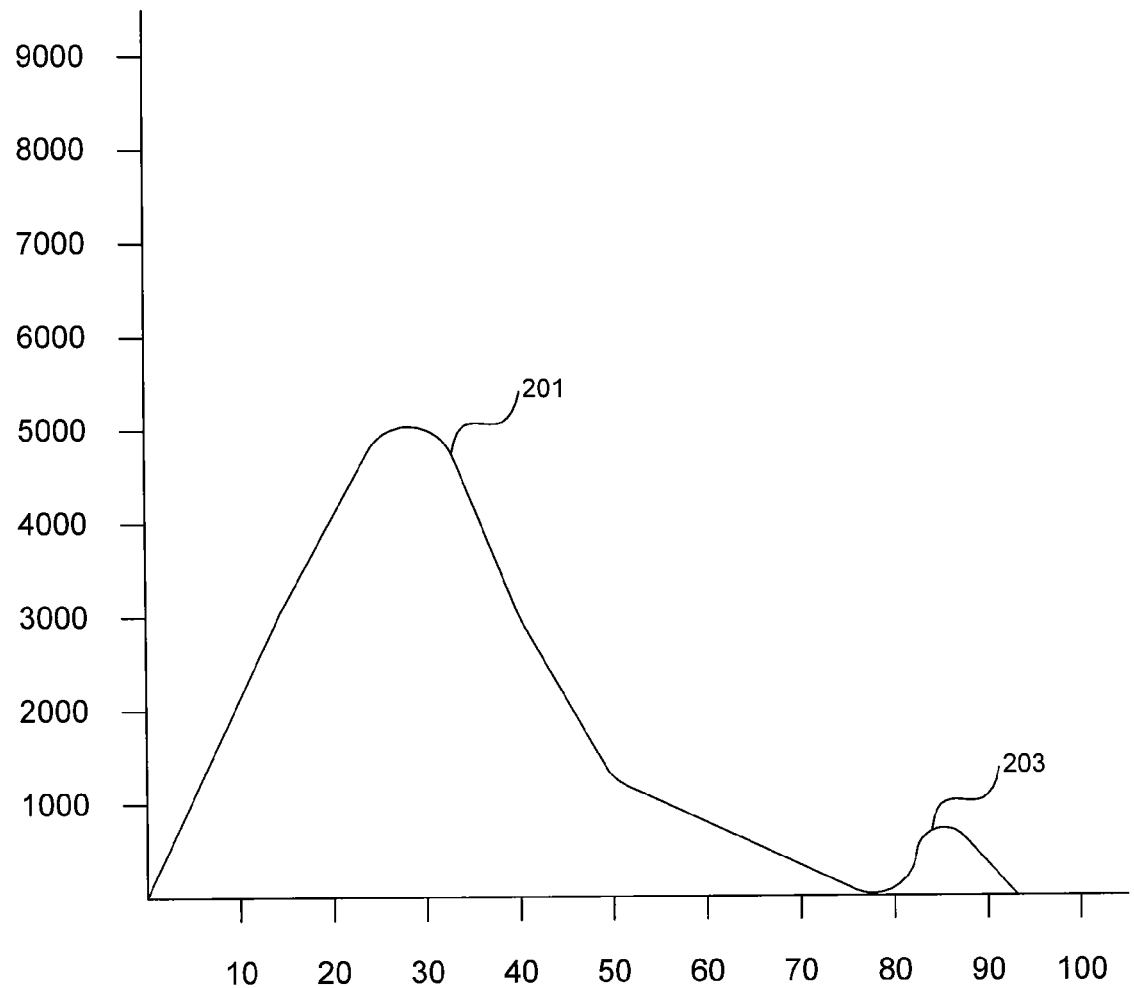
FIG. 13 is a plot of distributions of matching and non-matching scores.

Referring now to FIG. 13, there is illustrated a plot of the distributions of scores in the non-match and match categories. The distribution of scores in the non-match category is designated by the numeral 201. The distribution of the scores in the match category is designated by the numeral 203. In FIG. 13, the number of scores is plotted against a range of arbitrary score values. The number of scores goes from 0 to 9,000 and the arbitrary scores go from 0 to 100. Statistical analysis of the distributions is well known to those skilled in the art. However, by inspection of FIG. 13, it can be seen that matching scores lie roughly in the range from 85 to 95. Non-matching scores lie roughly in the range from 10 to about 80. Thus, a score of about 85 would indicate a high probability of a match and a very low probability of a non-match. On the other hand, a score of 70 would indicate a very low probability of a match. Thus, the method of the present invention provides a method for converting arbitrary numerical scores to relatively precise probabilities of matches and non-matches. The probabilities obtained from different biometrics can be combined in a well known way to produce a probability of a match or non-match based on multiple biometrics.

Figure 14:
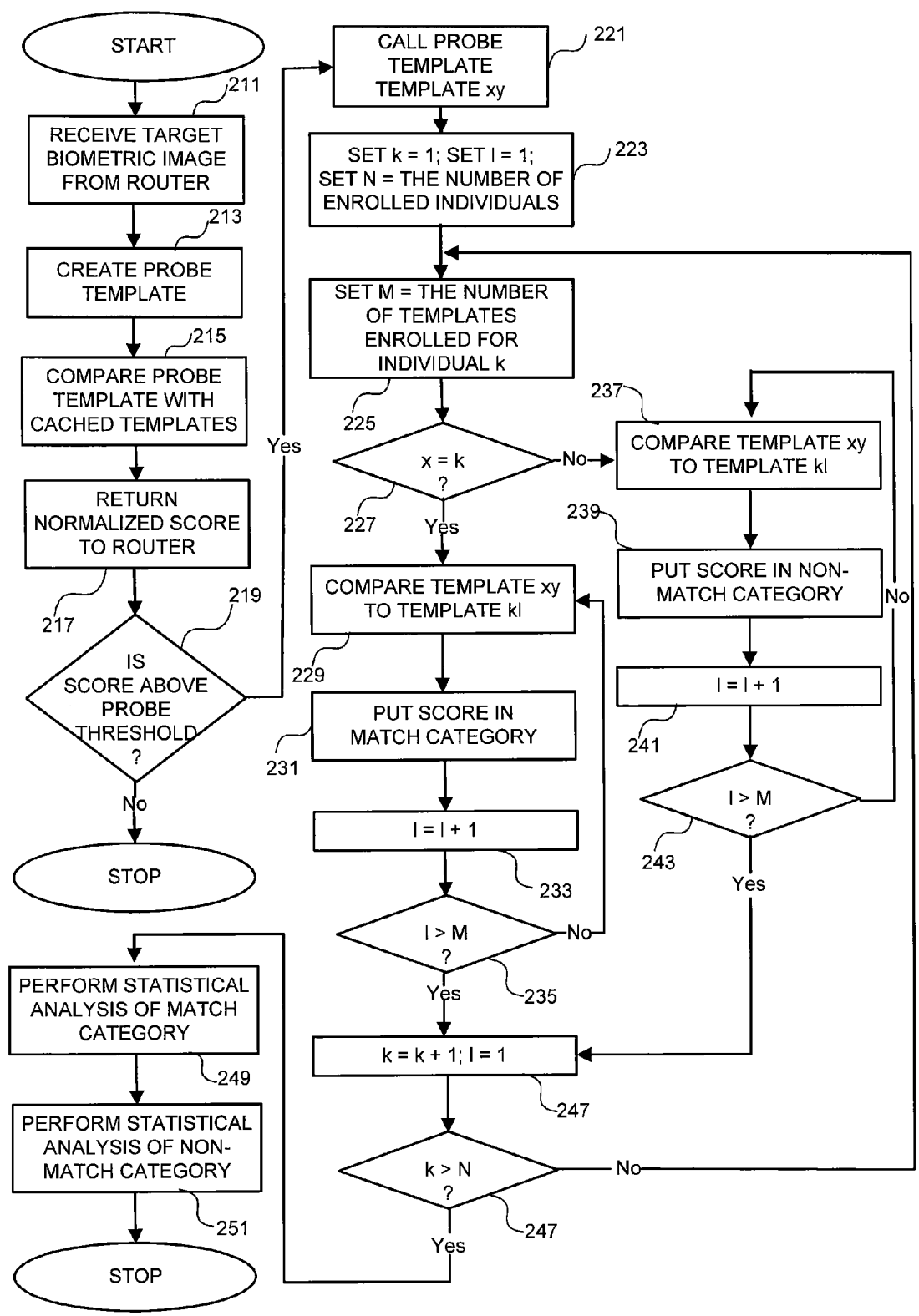
FIG. 14 is a flowchart of an embodiment of statistical normalization refinement according to the present invention.

Referring now to FIG. 14 there is illustrated a flow chart of a dynamic system for improving the accuracy of the method according to the present invention. A biometric matching engine receives a target biometric image from the router at block 211. The biometric matching engine creates a probe template in the manner described above at block 213. Then, the biometric matching engine compares the template with cached templates at block 215. Finally, the biometric matching engine returns a score to the router, at block 217, as described above. Then, the biometric matching engine tests at decision block 219 if the score is above a particular probe threshold. If not, processing stops. However, if the score is above the probe threshold, then the system calls the probe template template xy as indicated at block 221. Then, the system sets index k equal to one, index l equal to one and sets the N equal to the number of individuals, at block 223. Then, the system sets M equal to the number of templates enrolled for individual k, at block 225. The system then tests at decision block 227 if k is equal to x, which would indicate that the probe template belongs to the same individual as template k. If so, the system compares template xy to template kl, at block 229, and puts the score in the match category at block 231. Then, the system increments index l to 1 plus one at block 233 and tests if l is greater than M, at decision block 235. If not, processing returns to block 229.

If, as determined at decision block 227, index k is not equal to index x, then the system compares template xy to template kl at block 237 and puts the score in the non-match category at block 239. Then, the system increments index l to 1 plus one, at block 241, and tests, at decision block 243 if l is greater than M. If not, processing returns to block 237. Processing continues until index l is greater than M, as determined at decision block 235 or decision block 243. Then, the system increments k to k plus one and sets l equal to one, as indicated at block 245. The system then tests, at decision block 247, if k is greater than N. If not, processing returns to block 225. Processing continues until, as determined at decision block 247, index k is greater than N, which indicates that the probe template has been tested against all templates cached in the system. Then, the system performs statistical analysis of the match category at block 249 and statistical analysis of the non-match category at 251.

From the for going it may be seen that the present invention overcomes the shortcomings of the prior art. The system completely and securely manages personal information and images for any given individual. The system efficiently manages the distribution and searching of assorted biometric templates, which can be optimized for throughput, concurrency, or both depending on the size and demands of the application in question. The system provides its advantages through a plugin based architecture, which enables the addition or switching of biometric plugins to occur easily. The system operates via a distributed architecture consisting of a router and at least one query, which are interconnected via a simple TCP/IP network. System operations are controlled via a client SDK, which also makes connections to the router via a TCP/IP connection. Commands are data transfer is carried out over this connection, enabling biometric functionality to reach infinitely far as the network infrastructure will allow.

Those skilled in the art will recognize alternative embodiments given the foregoing description. Accordingly, the foregoing description is for the purpose of illustration and not limitation. Certain features may be used independent of or in combination with other features, all would be apparent to one skilled in the art.

What is claimed is:

1. A method of producing a score in a multimodal biometric system comprising:

forming a set of enrolled biometric data records, each enrolled biometric data record comprising a record identifier, an enrolled biometric template of a first type and an enrolled biometric template of a second type;

comparing a probe biometric template of said first type to enrolled biometric templates of said first type to produce a set of first scores;

saving in a match set biometric data records wherein the first score for the data record passes a first biometric threshold;

comparing a probe biometric template of said second type to biometric templates of said second type in said match set to produce a set of second scores;

saving biometric data records in said match set wherein the second score for the data record passes a second biometric threshold;

comparing the probe biometric template of the first type to saved biometric templates of the first type in the match set to produce another set of first scores;

removing from the match set biometric data records wherein the another first score for the data record passes another first biometric threshold;

comparing the probe biometric template of the second type to saved biometric templates of the second type in the match set to produce another set of second scores; and removing from the match set the biometric data records wherein the another second score for the data record passes another second biometric threshold, wherein:

the another first biometric threshold is more restrictive than the first biometric threshold; and the another second biometric threshold is more restrictive than the second biometric threshold.

2. The method of producing the score in the multimodal biometric system according to claim 1, further comprising a step of enrolling the biometric data records, wherein captured biometric images are converted into the enrolled biometric templates, and the probe biometric templates are created.

3. The method of producing the score in the multimodal biometric system according to claim 2, wherein demographic data of an individual associated with the record identifier is received.

4. The method of producing the score in the multimodal biometric system according to claim 3, wherein the demographic data includes at least one of the individual's name, sex, height, weight, hair color, or eye color.

5. The method of producing the score in the multimodal biometric system according to claim 1, wherein the types comprise two or more of hand geometry, finger print, ten finger live scan, iris, palm, full hand, signature, ear, finger vein, retina, face, DNA or voice.

6. The method of producing the score in the multimodal biometric system according to claim 1, wherein an order in which the comparing limitations are performed is pre-determined and stored in the database.

7. A system for producing multimodal biometric scores, the system comprising:

a database for storing biometric data records, each biometric data record comprising a record identifier, a biometric template of a first type and a biometric template of a second type; and a biometric matching engine that receives biometric images, converts the biometric images to the biometric templates of respective types, and creates probe biometric templates of respective types, the biometric matching engine comprising:

a first biometric recognition unit adapted to run a first application, wherein:

the probe biometric template of the first type is compared to the biometric templates of the first type to produce a set of first scores, if the first score for a biometric data record passes a first biometric threshold, the biometric data record is saved in a match set in the database;

a second biometric recognition unit adapted to run a second application, wherein:

for each biometric data record saved in the match set, the probe biometric template of the second type is compared to the biometric templates of the second type to produce a set of second scores, and if the second score for a biometric data record passes a second biometric threshold, the biometric data record is removed from the match set in the database, wherein:

if the first score for the biometric data record passes another first biometric threshold, the biometric data record is removed from the match set in the database, the another first biometric threshold is more restrictive than the first biometric threshold, if the second score for the biometric data record passes another second biometric threshold, the biometric data record is removed from the match set in the database, and the another second biometric threshold is more restrictive than the second biometric threshold.

8. The system for producing multimodal biometric scores according to claim 7, further comprising:

a client device that includes:
a first capture device for capturing the biometric images of the first type, and
a second capture device for capturing the biometric images of the second type; and a router that receives the biometric images from the client device, transmits the biometric images to the biometric matching engine, receives results from the biometric matching engine, and sends the results to the client device.

9. The system for producing multimodal biometric scores according to claim 7, further comprising:

a demographic database for storing demographic data of an individual associated with the record identifier, wherein the demographic data comprises at least one of the individual's name, sex, height, weight, hair color, or eye color.

10. The system for producing multimodal biometric scores according to claim 7, wherein the types comprise two or more of hand geometry, finger print, ten finger live scan, iris, palm, full hand, signature, ear, finger vein, retina, face, DNA or voice.

11. The system for producing multimodal biometric scores according to claim 7, wherein the three removals from the matched set in the database are performed in succession.

* * * * *

UNITED STATES PATENT AND TRADEMARK OFFICE
CERTIFICATE OF CORRECTION

Page 1 of 1

PATENT NO. : 7,606,396 B2
APPLICATION NO. : 11/927476
DATED : October 20, 2009
INVENTOR(S) : S. James Miller, Jr. et al.

It is certified that error appears in the above-identified patent and that said Letters Patent is hereby corrected as shown below:

On the Title Page, change item (12) to Miller, Jr. et al.

On the Title Page, item (75) Inventor "James S. Miller" should read -- S. James Miller, Jr. --

Signed and Sealed this
Thirtieth Day of June, 2015

Michelle K. Lee
*Director of the United States Patent and Trademark Office*